(12) United States Patent
Sonobe et al.

(10) Patent No.: US 8,995,905 B2
(45) Date of Patent: Mar. 31, 2015

(54) WIRELESS NETWORK RELAY APPARATUS

(75) Inventors: Satoshi Sonobe, Tokyo (JP); Hiroaki Nakajima, Tokyo (JP); Yoshitaka Nakao, Tokyo (JP); Kentarou Kudou, Tokyo (JP); Hideyuki Muto, Tokyo (JP)

(73) Assignee: NEC Corporation, Tokyo (JP)

( * ) Notice: Subject to any disclaimer, the term of this patent is extended or adjusted under 35 U.S.C. 154(b) by 245 days.

(21) Appl. No.: 13/698,238

(22) PCT Filed: May 16, 2011

(86) PCT No.: PCT/JP2011/061182
§ 371 (c)(1),
(2), (4) Date: Nov. 15, 2012

(87) PCT Pub. No.: WO2011/145554
PCT Pub. Date: Nov. 24, 2011

(65) Prior Publication Data
US 2013/0059529 A1    Mar. 7, 2013

(30) Foreign Application Priority Data

May 19, 2010  (JP) .................................. 2010-115585

(51) Int. Cl.
*H04B 7/155* (2006.01)
*H04L 12/26* (2006.01)
(Continued)

(52) U.S. Cl.
CPC ............ *H04B 7/15521* (2013.01); *H04L 43/00* (2013.01); *H04L 1/0003* (2013.01); *H04L 27/0008* (2013.01); *H04W 88/04* (2013.01); *H04L 2001/0097* (2013.01)
USPC .................................. 455/23; 455/9; 370/315

(58) Field of Classification Search
USPC .............. 455/7, 9, 11.1, 16, 23; 370/252, 315
See application file for complete search history.

(56) References Cited

U.S. PATENT DOCUMENTS 7,408,892 B2 *  8/2008  Dale et al. ...................... 370/316
7,953,365 B2 *  5/2011  Lim et al. ...................... 455/11.1
(Continued)

FOREIGN PATENT DOCUMENTS

CN    101075838 A    11/2007
CN    101253706 A    8/2008
(Continued)

OTHER PUBLICATIONS

International Search Report for PCT/JP2011/061182 dated Aug. 9, 2011.
(Continued)

*Primary Examiner* — Sonny Trinh
(74) *Attorney, Agent, or Firm* — Sughrue Mion, PLLC

(57) ABSTRACT

A wireless network relay apparatus includes a Layer 2 switch and a line control device as well as wireless/wired line terminating devices performing band limitation associated with an AMR function. It measures traffic passing through each line terminating device in inflow/outflow path directions. Upon detecting a modulation scheme changed due to an AMR function in a wireless area, it may specify a line terminating device so as to read a desired modulation scheme from a transmission source modulation scheme conversion table of the line control device based on traffic. It may change a local modulation scheme with a desired modulation scheme when a difference therebetween is above a predetermined number of stages. By tracking a modulation scheme changed for a transmission destination, it is possible to appropriately change a modulation scheme for a transmission source, thus suppressing traffic without discarding necessary data.

10 Claims, 6 Drawing Sheets

(51) Int. Cl.
　　*H04L 1/00*　　　(2006.01)
　　*H04L 27/00*　　(2006.01)
　　*H04W 88/04*　　(2009.01)

(56) References Cited

U.S. PATENT DOCUMENTS

| | | | |
|---|---|---|---|
| 8,019,288 B2* | 9/2011 | Yu et al. | 455/69 |
| 8,532,646 B2* | 9/2013 | Watanabe et al. | 455/422.1 |
| 8,787,186 B2* | 7/2014 | Sexton et al. | 370/252 |
| 8,811,887 B2* | 8/2014 | Dottling et al. | 455/7 |
| 2010/0027457 A1 | 2/2010 | Okuda | |
| 2011/0038276 A1* | 2/2011 | Ninagawa | 370/252 |
| 2013/0028127 A1* | 1/2013 | Zheng et al. | 370/252 |

FOREIGN PATENT DOCUMENTS

| | | |
|---|---|---|
| CN | 101523943 A | 9/2009 |
| JP | 2004-274700 A | 9/2004 |
| JP | 2005-79740 A | 3/2005 |
| JP | 2008-211344 A | 9/2008 |
| JP | 2008-211345 A | 9/2008 |
| JP | 2009-135928 A | 6/2009 |
| JP | 2009-177459 A | 8/2009 |
| WO | 2006/098273 A1 | 9/2006 |
| WO | 2009141975 A1 | 11/2009 |

OTHER PUBLICATIONS

Notice of Allowance dated Nov. 19, 2013, issued by the Japan Patent Office in corresponding Japanese Application No. 2010-115585.

Communication dated Jul. 30, 2014, issued by the State Intellectual Property Office of the People's Republic of China in counterpart Application No. 201180024035.3.

* cited by examiner

FIG. 5

| TRANSMISSION DESTINATION MODULATION SCHEME / TRAFFIC | QPSK | 16QAM | 32QAM | 64QAM | 128QAM | 256QAM | 512QAM |
|---|---|---|---|---|---|---|---|
| ~1Mbps | NO CHANGE | 16QAM | 32QAM | 64QAM | 128QAM | 256QAM | 512QAM |
| 1Mbps~15Mbps | NO CHANGE | 16QAM | 32QAM | 64QAM | 128QAM | 128QAM | NO CHANGE |
| 15Mbps~30Mbps | NO CHANGE | 16QAM | 32QAM | 64QAM | 128QAM | 128QAM | NO CHANGE |
| 30Mbps~75Mbps | 16QAM | 32QAM | 64QAM | 64QAM | 128QAM | 128QAM | NO CHANGE |
| 75Mbps~100Mbps | 16QAM | 32QAM | 64QAM | 128QAM | 256QAM | 256QAM | NO CHANGE |
| 100Mbps~200Mbps | 16QAM | 64QAM | 64QAM | 128QAM | 256QAM | 512QAM | NO CHANGE |
| 200Mbps~ | 32QAM | 64QAM | 64QAM | 128QAM | 256QAM | 512QAM | NO CHANGE |

WIRELESS NETWORK RELAY APPARATUS

CROSS REFERENCE TO RELATED APPLICATIONS

This application is a National Stage of International Application No. PCT/JP2011/061182 filed May 16, 2012, claiming priority based on Japanese Patent Application No. 2010-115585 filed May 19, 2012, the contents of all of which are incorporated herein by reference in their entirety.

TECHNICAL FIELD

The present invention relates to a wireless network relay apparatus having a band-limiting function, a method of changing a modulation scheme in a wireless network relay apparatus, and a computer program.

The present application claims priority on Japanese Patent Application No. 2010-115585 filed May 19, 2010, the entire content of which is incorporated herein by reference.

BACKGROUND ART

Conventionally, it is necessary for wireless network relay apparatuses to implement band-limiting functions in order to cope with variations of communicating conditions such as changes of weather conditions. As a band-limiting function, an AMR (Adaptive Modulation Radio) function, i.e. a function for optimizing a link capacity of a radio area depending on a weather condition, has been developed.

Patent Literature 1 discloses a band-setting method in a wired/wireless network, which dynamically sets only the necessary band to an end-to-end networking band applied between a wireless terminal device and a server. A wireless terminal device receiving band information (e.g. a wired band or a wireless band) of content data from a server transmits a wireless band setting request, including information for setting a band necessary for transmission of content data to a wireless access network with a radio base station, to a radio base station while transmitting a wired band setting request, including information for setting a band necessary for transmission of content data to a wired network between a radio base station and a serer, to a server. Thus, it is possible to dynamically set only the necessary band to an end-to-end networking band between a wireless terminal device and a server.

Similar to Patent Literature 1, Patent Literature 2 discloses a band setting method in a wired/wireless network. A server receiving a content data transmission request from a wireless terminal device specifies a radio base station connected to the wireless terminal device so as to transmit wired band information, corresponding to content data, to the radio base station while setting a wired band, specified by the wired band information, to a wired network with the radio base station. Additionally, the radio base station creates wireless band information, adapted to a wireless access network with the wireless terminal device, based on the received wired band information, thus setting a wireless band. Thus, it is possible to dynamically set only the necessary band to an end-to-end networking band between a wireless terminal device and a server.

Patent Literature 3 discloses a method for determining a modulation scheme for use in a wireless transmission device employing an adaptive modulation scheme. A wireless transmission device, including an automatic transmitter power control (ATPC) function and an adaptive modulation scheme, changes over its modulation scheme by use of reception power of a local station and transmitter power redundancy of an opposite station. Alternatively, it is possible to change over a modulation scheme by use of transmitter power redundancy of a local station and reception power of an opposite station.

CITATION LIST

Patent Literature

Patent Literature 1: Japanese Patent Application Publication No. 2004-274700
Patent Literature 2: Japanese Patent Application Publication No. 2005-79740
Patent Literature 3: Japanese Patent Application Publication No. 2009-177459

SUMMARY OF INVENTION

Technical Problem

The conventional wireless network relay apparatus suffers from a problem of an unnecessary decline of traffic unless it carries out band limitation on a radio area of a transmission source when it utilizes an AMR function for band limitation.

Normally, the wireless network relay apparatus adopting an AMR function does not change a modulation scheme in a radio area of a transmission source even when a modulation scheme is changed in a radio area of a transmission destination. In this case, the wireless network relay apparatus may be involved in a situation for forwarding higher traffic than that of a band applied to a radio area of a transmission destination and therefore decline traffic which need not be declined.

The technologies disclosed in Patent Literatures 1 to 3 do not aim to prevent an unnecessary decline of traffic and therefore do not aim to define a band-limiting method in a radio area of a transmission source in association with an AMR function.

Solution to Problem

The present invention is made in consideration of the foregoing circumstances, and it is an object of the present invention to provide a wireless network relay apparatus which is able to define a method for limiting a band in a radio area of a transmission source in association with an AMR function and to realize precise traffic suppression between devices in a wireless network.

It is another object of the present invention to provide a method for changing a modulation scheme in a wireless network relay apparatus implementing band limitation with an AMR function, and a computer program.

The present invention achieves band limitation in a radio area of a transmission source in association with an AMR function and precise traffic suppression between devices in a wireless network without using a dedicated line or a dedicated protocol.

That is, the present invention aims to prevent an unnecessary decline of traffic and therefore provides the following technical features.

(1) It is necessary to implement a traffic control method for wireless lines (specifically, a process for changing a modulation scheme) in a wireless network equipped with a plurality of wireless network relay apparatuses performing band limitation with an AMR function and relaying traffic via wireless lines.

(2) It is necessary to implement traffic suppression by automatically changing a modulation scheme in a radio area with a wireless network relay apparatus of a transmission source based on traffic being monitored or recorded when a modulation scheme in a radio area is changed due to an AMR function with a wireless network relay apparatus of a transmission destination. It is necessary to orderly propagate traffic suppression toward a wireless network relay apparatus managing a radio area with a traffic originating source, thus achieving traffic priority control in the place near a traffic originating source.

(3) It is necessary to appropriately set a threshold used for determining whether or not a modulation scheme should be changed in a radio area.

The present invention provides a wireless network relay apparatus, which is equipped with a plurality of line terminating devices corresponding to a plurality of communication lines and which performs line limitation associated with an AMR function. The wireless network relay apparatus includes a traffic measuring part configured to measure traffic, passing through a plurality of line terminating devices, in a plurality of directions, thus recording total traffic; a modulation scheme detecting part configured to detect whether or not a modulation scheme is changed due to an AMR function in a wireless area; a modulation scheme judging part configured to specify the line terminating device of the communication line corresponding to the wireless area whose modulation scheme is changed and to judge whether or not a local modulation scheme should be changed; a modulation scheme determining part configured to determine a desired modulation scheme based on the recorded traffic with the specified line terminating device when it is judged that the local modulation scheme should be changed; and a modulation scheme changing part configured to change the local modulation scheme with the desired modulation scheme.

The present invention provides a modulation scheme changing method adapted to a wireless network relay apparatus, which is equipped with a plurality of line terminating devices corresponding to a plurality of communication lines and which performs band limitation associated with an AMR function. The modulation scheme changing method includes a traffic measuring step of measuring traffic, passing through a plurality of line terminating devices in a plurality of directions, thus recording total traffic; a modulation scheme detecting step of detecting whether or not a modulation scheme is changed due to an AMR function in a wireless area; a modulation scheme judging step of specifying the line terminating device of the communication line corresponding to the wireless area whose modulation scheme is changed, thus judging whether or not a local modulation scheme should be changed; a modulation scheme determining step of determining a desired modulation scheme based on the recorded traffic with the specified line terminating device when it is judged that the local modulation scheme should be changed; and a modulation scheme changing step of changing the local modulation scheme with the desired modulation scheme.

The present invention provides a computer program causing a computer to execute a modulation scheme changing method adapted to a wireless network relay apparatus, which is equipped with a plurality of line terminating devices corresponding to a plurality of communication lines and which performs band limitation associated with an AMR function. The modulation scheme changing method includes the foregoing traffic measuring step, the modulation scheme detecting step, the modulation scheme judging step, the modulation scheme determining step, and the modulation scheme changing step.

Advantageous Effects of Invention

A wireless network relay apparatus of the present invention is designed to perform precise band limitation in association with an AMR function irrespective of a variation of a band of a transmission destination, thus achieving traffic suppression while protecting traffic which should not be declined. This process can be realized without reception/transmission of band-limiting data for a dedicated line; hence, it is possible to propagate traffic suppression toward a traffic originating source. Additionally, it is possible to prevent a modulation scheme from being frequently changed because a threshold is set for determination as to whether or not a modulation scheme of a transmission source should be changed when a modulation method in a radio area is changed due to an AMR function.

BRIEF DESCRIPTION OF DRAWINGS

[FIG. 5] A figure showing one example of a transmission source modulation scheme conversion table which is searched by the line control device.

DESCRIPTION OF EMBODIMENT

A wireless network relay apparatus of the present invention is equipped with an AMR function for optimizing a link capacity in a radio area depending on a weather condition. Even when a band of a transmission destination is changed due to a weather condition, the wireless network relay apparatus is able to achieve band limitation between opposite devices with respect to a band of a transmission source without reception/transmission of a dedicated protocol between a transmission source and a transmission destination.

Specifically, a wireless network relay apparatus of a transmission source measures and records traffic, wherein it determines a wireless modulation scheme of a transmission source so as to automatically change the wireless modulation scheme of the transmission source based on the recorded traffic when a modulation scheme is changed due to an AMR function in a wireless network relay apparatus of a transmission destination. This causes propagation of traffic suppression so as to protect traffic, which should not be declined, by way of traffic priority control in the place near a traffic origination source.

Next, a wireless network relay apparatus and a method of changing its modulation scheme according to the present invention will be described in detail.

The embodiment explains a wireless network relay apparatus and a method of changing its modulation scheme, wherein the embodiment includes a computer program realizing constituent elements and functions thereof.

Figure 1:
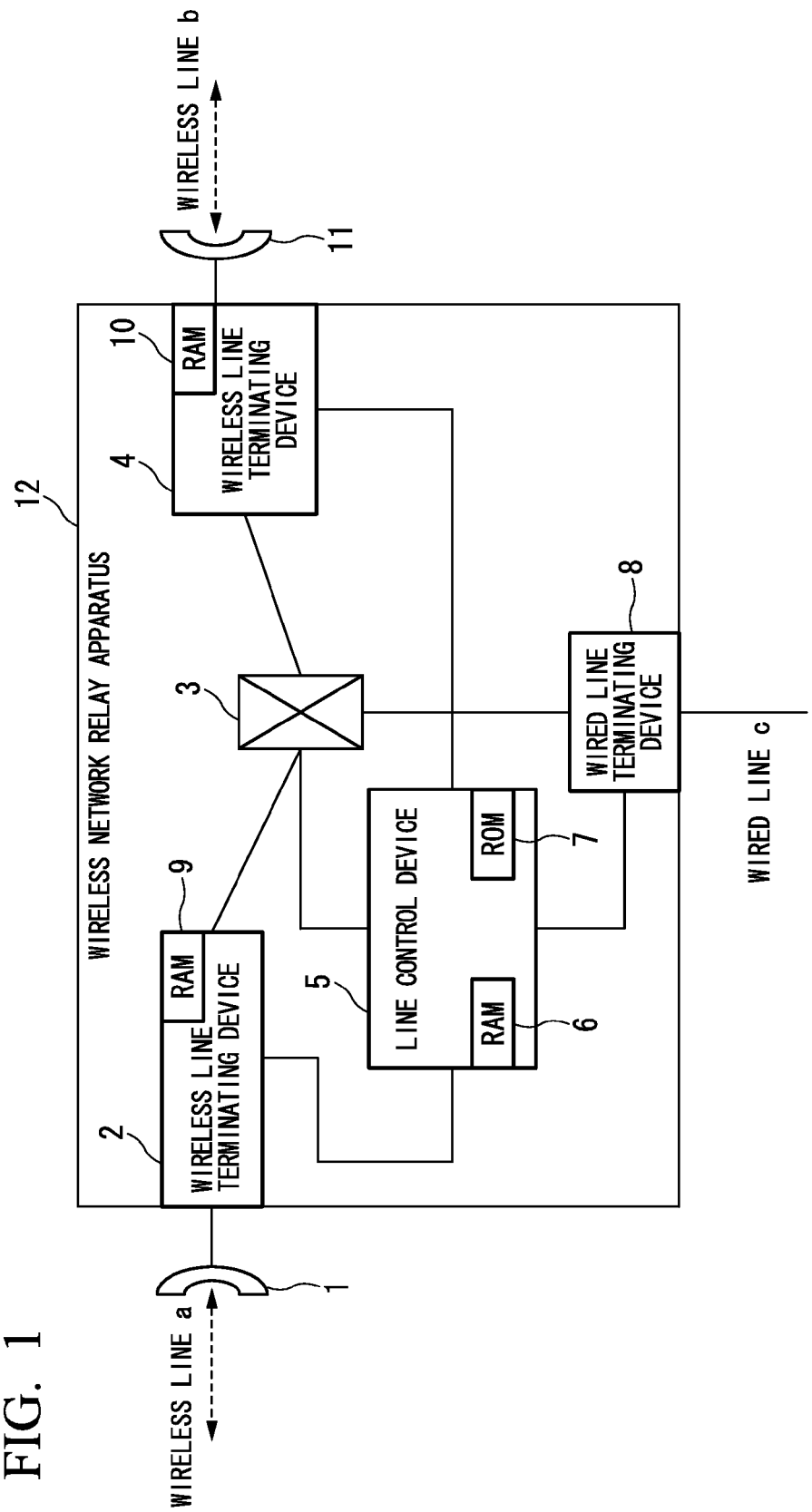
[FIG. 1] A block diagram showing the constitution of a wireless network relay apparatus according to an embodiment of the present invention.

FIG. 1 is a block diagram showing the constitution of a wireless network relay apparatus 12 according to the embodiment of the present invention.

The wireless network relay apparatus 12 of FIG. 1 relaying a wireless line a, a wireless line b, and a wired line c includes antennas 1, 11 for reception and transmission of radio waves, wireless line terminating devices 2, 4 for terminating the wireless lines a, b, a wired line terminating device 8 for terminating the wired line c, a Layer 2 switch 3, and a line control device 5. The wireless line terminating device 2 includes a RAM 9 recording a modulation scheme of the wireless line a, while the wireless line terminating device 4 includes a RAM 10 recording a modulation scheme of the wireless line b.

The function of the wireless network relay apparatus 12 will be described with reference to FIG. 1.

The Layer 2 switch 3 implements a switching function of Ether frame packets between the wireless line terminating devices 2, 4 and the wired line terminating device 8. The wireless network relay apparatus 12 performs communication with the wireless line a via a path connecting the antenna 1, the wireless circuit terminating device 2, and the Layer 2 switch 3. Additionally, the wireless network relay apparatus 12 performs communication with the wireless line b via a path connecting the antenna 11, the wireless line terminating device 4, and the Layer 2 switch 3. Furthermore, the wireless network relay apparatus 12 performs communication with the wired line c via a path connecting the wired line terminating device 8 and the Layer 2 switch 3.

The line control device 5 includes a RAM 6 and a ROM 7. The RAM 6 stores traffic passing through the Layer 2 switch 3 for each predetermined time. The traffic is stored with respect to directions A to F independently.

A (2→4): A direction from the wireless line terminating device 2 to the wireless line terminating device 4.

B (4→2): A direction from the wireless line terminating device 4 to the wireless line terminating device 2.

C (2→8): A direction from the wireless line terminating device 2 to the wired line terminating device 8.

D (8→2): A direction from the wired line terminating device 8 to the wireless line terminating device 2.

E (4→8): A direction from the wireless line terminating device 4 to the wired line terminating device 8.

F (8→4): A direction from the wired line terminating device 8 to the wireless line terminating device 4.

The ROM 7 of the line control device 5 stores a transmission source modulation scheme conversion table, determining a modulation scheme of a transmission source which should be changed in conformity with a modulation scheme of a transmission destination, in connection with traffic.

Figure 2:
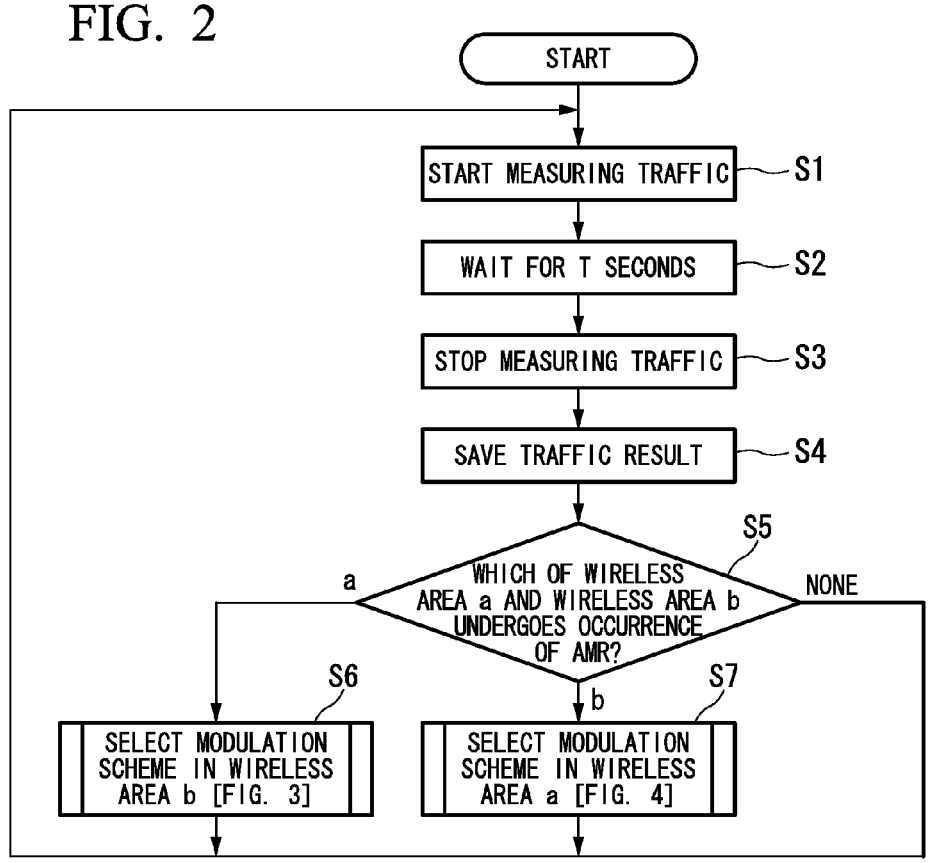
[FIG. 2] A flowchart illustrating the operation of a line control device of a wireless network relay apparatus.

FIG. 2 is a flowchart illustrating the operation of the line control device 5 of the wireless network relay apparatus 12. The operation of the line control device 5 of the wireless network relay apparatus 12 will be described with reference to FIGS. 1 and 2.

(Step S1)

First, the line control device 5 starts measuring traffic passing through the Layer 2 switch 3.

(Step S2)

Next, the line control device 5 waits for a predetermined time (T seconds).

(Step S3)

Thereafter, the line control device 5 stops measuring traffic.

(Step S4)

The line control device 5 stores traffic passing through the Layer 2 switch 3 for a predetermined time (T seconds) in the RAM 6. The traffic should be recorded with respect to the six directions A to F. Additionally, an average value of traffic which occurs in T seconds is increased by 1.2 times so as to calculate a traffic value.

(Step S5)

With reference to a modulation scheme stored in the RAM 9 of the wireless line terminating device 2 and a modulation scheme stored in the RAM 10 of the wireless line terminating device 4, the line control device 5 determines whether a wireless modulation scheme has been changed due to an AMR function in a communication area of the wireless line a (hereinafter, referred to as a "wireless area a") and/or a communication area of the wireless line b (hereinafter, referred to as a "wireless area b") or whether wireless modulation schemes have not been changed in both the wireless areas a, b.

When wireless modulation schemes are changed in both the wireless areas a, b, the line control device 5 determines a wireless area undergoing a larger variant as a wireless area whose wireless modulation scheme has been changed due to an AMR function.

However, the line control device 5 does not change its modulation scheme when wireless modulation schemes are changed in both the wireless areas a, b, when both the wireless areas a, b undergo the same variant, and when both the wireless areas a, b are equally increased or decreased in their variants.

In contrast, the line control device 5 determines a wireless area with a decreased band as a wireless area whose wireless modulation scheme has been changed due to an AMR function when wireless modulation schemes are changed in both the wireless areas a, b, and when both the wireless areas a, b undergo the same variant, but one of the wireless areas a, b undergoes a decreased variant of its band.

(Step S6)

When a wireless modulation scheme is changed due to an AMR function in the wireless area a, for example, the line control device 5 changes the modulation scheme of the wireless area b upon determining the modulation scheme such that the wireless area a is identified as a transmission destination whilst the wireless area b is identified as a transmission source. Thereafter, the flow reverts to step S1.

(Step S7)

In contrast, when a wireless modulation scheme is changed due to an AMR function in the wireless area b, the line control device 5 changes the modulation scheme of the wireless area a upon determining the modulation scheme such that the wireless area b is identified as a transmission destination whilst the wireless area a is identified as a transmission source. Thereafter, the flow reverts to step S1.

When wireless modulation schemes are not changed due to an AMR function in both the wireless areas a, b, the line control device 5 does not carry out a process of changing a modulation scheme, and therefore the flow immediately reverts to step S1. The foregoing processes of steps S1 to S7 are periodically executed.

Figure 3:
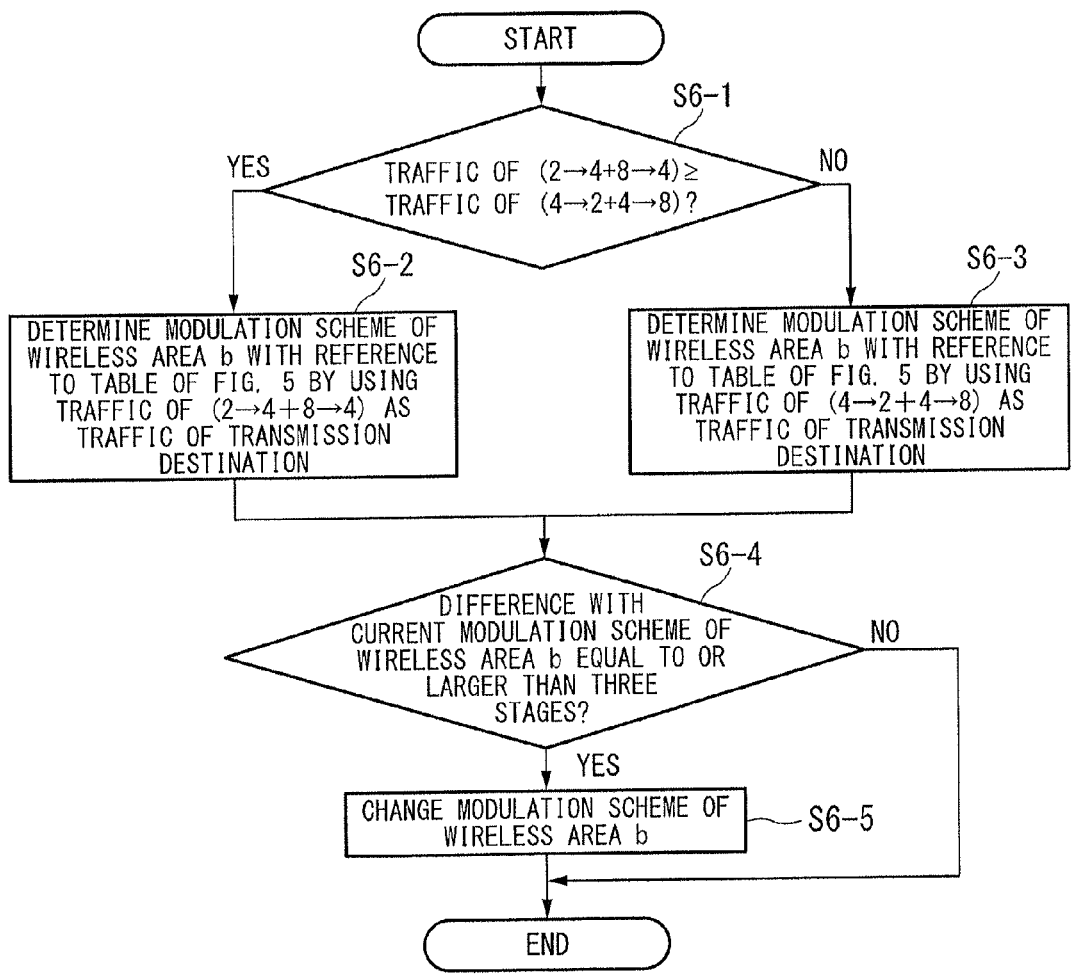
[FIG. 3] A flowchart showing the detailed process of step S6 shown in FIG. 2.

FIG. 3 is a flowchart illustrating the detailed operation of the line control device 5 of the wireless network relay apparatus 12, specifically illustrating the detailed process of step S6 shown in FIG. 2.

The operation of the line control device 5 of the wireless network relay apparatus 12 will be described in detail with reference to FIGS. 1 and 3.

(Step S6-1)

The line control device 5 checks whether or not the total of the traffic of the direction A (2→4) and the traffic of the direction F (8→4) is equal to or larger than the total of the traffic of the direction B (4→2) and the traffic of the direction E (4→8), all of which are stored in the RAM 6. When the former total (i.e. the traffic of the direction A (2→4) and the traffic of the direction F (8→4)) is equal to or larger than the latter total (i.e. the traffic of the direction B (4→2) and the traffic of the direction E (4→8)) (YES), the flow proceeds to step S6-2. When the former total is less than the latter total (NO), the flow proceeds to step S6-3. This is because it is necessary to determine whether the traffic of the radio area b runs in the upstream direction or the downstream direction, thus determining which of the traffic running in the upstream/downstream direction should be used as a key for changing the modulation scheme of the wireless area b serving as the transmission source.
(Step S6-2)

The line control device 5 utilizes the total of the traffic of the direction A (2→4) and the traffic of the direction F (8→4) as the traffic of the transmission destination. It is possible to determine the modulation scheme, which should be applied to the wireless area b, by searching through the transmission source modulation scheme conversion table stored in the ROM 7 by using the traffic of the transmission destination as a key.
(Step S6-3)

The line control device 5 utilizes the total of the traffic of the direction B (4→2) and the traffic of the direction E (4→8) as the traffic of the transmission destination. It is possible to determine the modulation scheme, which should be applied to the wireless area b, by searching through the transmission source modulation scheme conversion table stored in the ROM 7 by using the traffic of the transmission destination as a key.
(Step S6-4)

Thereafter, the line control circuit 5 reads the current modulation scheme stored in the ROM 10 of the wireless circuit terminating device 4 so as to carry out comparison using the bandwidth and the modulation scheme, which should be applied to the wireless area b and which is determined in either step S6-2 or step S6-3, as parameters. Herein, it is necessary to determine whether or not the difference between the current modulation scheme and the newly determined modulation scheme is equivalent to a variant corresponding to the predetermined number of stages or more (e.g. three stages or more). When the difference between the current modulation scheme and the newly determined modulation scheme is three stages or more (YES), the flow proceeds to step S6-5 so as to change the modulation scheme of the wireless area b. In contrast, when the difference between the current modulation scheme and the newly determined modulation scheme is less than three stages (NO), it is unnecessary to change the modulation scheme of the wireless area b.

Figure 4:
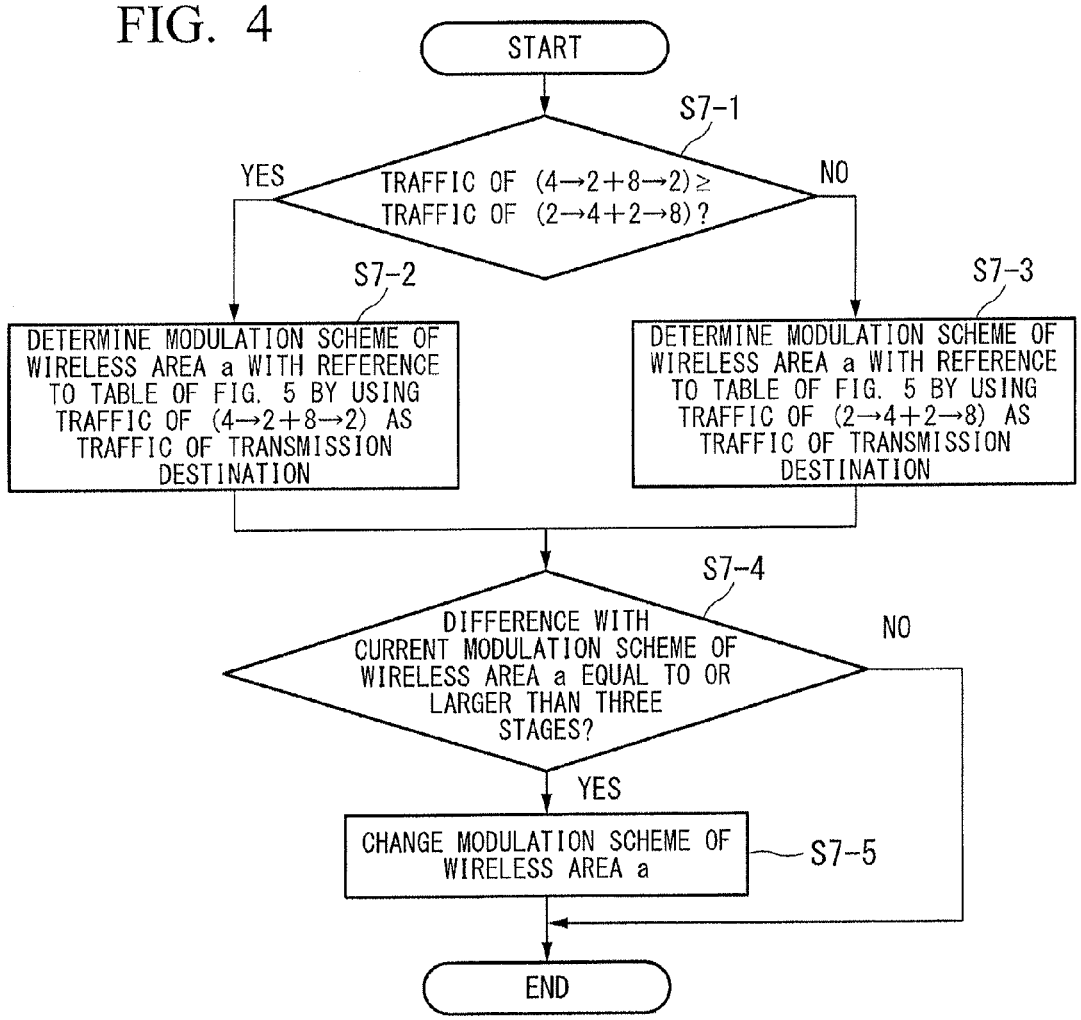
[FIG. 4] A flowchart showing the detailed process of step S7 shown in FIG. 2.

FIG. 4 is a flowchart showing the detailed operation of the line control device 5 of the wireless network relay apparatus 12, illustrating the detailed process of step S7 shown in FIG. 2.

The operation of the line control device 5 of the wireless network relay apparatus 12 will be described in detail with reference to FIGS. 1 and 4.
(Step S7-1)

The line control device 5 checks whether or not the total of the traffic of the direction B (4→2) and the traffic of the direction D (8→2) is equal to or larger than the total of the traffic of the direction A (2→4) and the traffic of the direction C (2→8), all of which are stored in the RAM 6. When the former total (i.e. the traffic of the direction B (4→2) and the traffic of the direction D (8→2)) is equal to or larger than the latter total (i.e. the traffic of the direction A (2→4) and the traffic of the direction C (2→8)) (YES), the flow proceeds to step S7-2. When the former total is less than the latter total (NO), the flow proceeds to step S7-3. This is because it is necessary to determine whether the traffic of the wireless area a runs in the upstream direction or the downstream direction, thus determining which of the traffic running in the upstream/downstream direction should be used as a key for changing the modulation scheme of the wireless area a serving as the transmission source.
(Step S7-2)

The line control device 5 utilizes the total of the traffic of the direction B (4→2) and the traffic of the direction D (8→2) as the traffic of the transmission destination. It is possible to determine the modulation scheme, which should be applied to the wireless area a, by searching through the transmission source modulation scheme conversion table stored in the ROM 7 by using the traffic of the transmission source as a key.
(Step S7-3)

The line control device 5 utilizes the total of the traffic of the direction A (2→4) and the traffic of the direction C (2→8) as the traffic of the transmission destination. It is possible to determine the modulation scheme, which should be applied to the wireless area a, by searching through the transmission source modulation scheme conversion table stored in the ROM 7 by using the traffic of the transmission source as a key.
(Step S7-4)

Thereafter, the line control device 5 reads the current modulation scheme stored in the RAM 9 of the wireless circuit terminating device 2 so as to carry out comparison using the bandwidth and the modulation scheme, which should be applied to the wireless area a and which is determined in either the step S7-2 or step S7-3, as parameters. Herein, it is necessary to determine whether or not the difference between the current modulation scheme and the newly determined modulation scheme is equivalent to a variant corresponding to the predetermined number of stages or more (e.g. three stages or more). When the difference between the current modulation scheme and the newly determined modulation scheme is three stages or more (YES), the flow proceeds to step S7-5 so as to change the modulation scheme of the wireless area a. In contrast, when the difference between the current modulation scheme and the newly determined modulation scheme is less than three stages (NO), it is unnecessary to change the modulation scheme of the wireless area a.

FIG. 5 shows an example of the transmission source modulation scheme conversion table which is searched with the line control device 5.

The transmission source modulation scheme conversion table stored in the ROM 7 is subjected to searching in steps S6-2, S6-3 and steps S7-2, S7-3 in the flowcharts shown in FIGS. 3 and 4. Additionally, the transmission source modulation scheme conversion table shows the correspondence relationship between the traffic passing through the Layer 2 switch 3 and the modulation scheme of the transmission destination, thus determining which modulation scheme should be applied to the wireless area of the transmission source.

When the transmission source modulation scheme conversion table shown in FIG. 5 is being searched using the traffic ranging from 30 Mbps to 75 Mbps and the modulation scheme of 16QAM applied to the wireless area of the transmission destination, for example, three stages or more are detected as the difference with the current modulation scheme applied to the wireless area of the transmission source; hence, it is necessary to change the modulation scheme of the wireless area of the transmission source with 32QAM.

Figure 6:
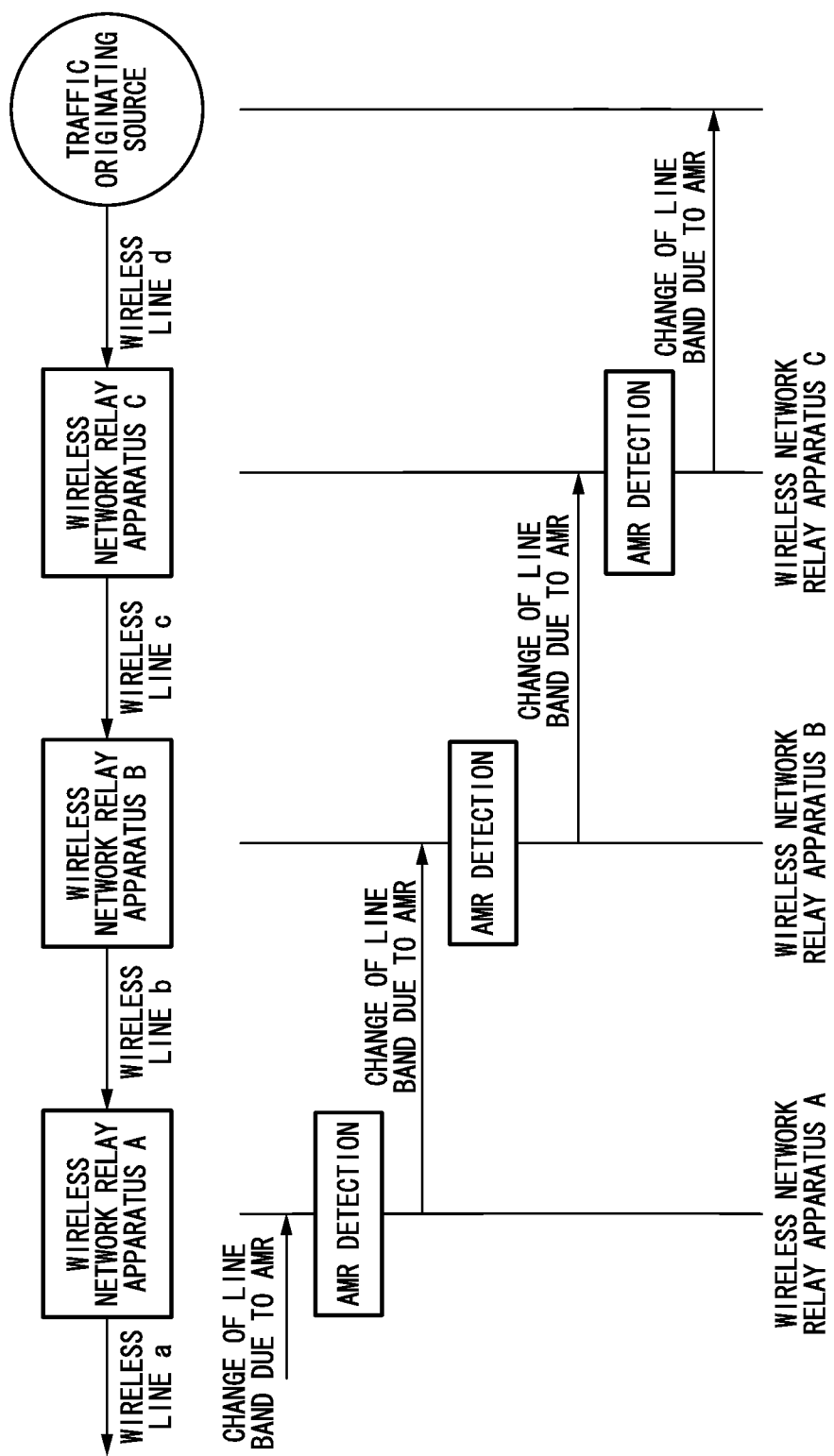
[FIG. 6] A figure showing an AMR detection and band limitation sequence in a wireless network system connecting a plurality of wireless network relay apparatuses.

FIG. 6 shows an example of a wireless network system connecting a plurality of wireless network relay apparatuses according to the present embodiment. Herein, it shows a sequence relating to band control and AMR detection using three wireless network relay apparatuses A, B, C.

When a band reduction due to an AMR function occurs in the wireless line a of the wireless network relay apparatus A, for example, a band change due to an AMR function may occur in the wireless line b as well. In this case, the wireless network relay apparatus B detects a band change in the wireless line b; therefore, it is necessary to carry out band limitation on the wireless line c, thus enabling QoS (Quality of Service) control in a traffic originating source.

Upon detecting a band change in the transmission destination, the wireless network relay apparatus of the present embodiment is able to carry out precise band limitation in association with the AMR function so as to prevent a decline of traffic which should not be declined, thus protecting the traffic necessary for communication.

When the wireless network system is configured using the wireless network relay apparatus of the present embodiment, it is possible to propagate traffic suppression without receiving and transmitting band control data for a dedicated line.

With the wireless network relay apparatus of the present embodiment selecting the optimum wireless modulation scheme, it is possible to set the wireless antenna with the optimum reception/transmission power; hence, it is expected to reduce power consumption in communication.

Moreover, it is possible to determine whether or not a modulation scheme should be changed in a wireless area of a transmission source when a modulation scheme is changed in a wireless area adopting an AMR function. By setting a threshold to the above determination, it is possible to suppress the frequent changing of modulation schemes.

In this connection, it is possible to implement computer control achieving the processing relating to at least a part of the constituent elements included in the wireless network relay apparatus according to the present invention, wherein it is possible to translate procedures shown in the flowcharts of FIGS. 2 to 4 into programs executable by a computer. It is possible to distribute computer programs stored in computer-readable storage media such as semiconductor memory, CD-ROM, and magnetic tapes. Alternatively, it is possible to read and execute programs from microcomputers, personal computers, or general-purpose computers.

INDUSTRIAL APPLICABILITY

The present invention is applied to a wireless network relay apparatus carrying out band limitation with an AMR function; hence, it is possible to precisely keep track of modulation schemes of wireless areas being changed due to weather conditions; it is possible to appropriately change the modulation scheme of a transmission source depending on the modulation scheme of a transmission destination without receiving and transmitting specific control data; it is possible to prevent a decline of traffic necessary for communication.

REFERENCE SIGNS LIST 1, 11 antenna
2, 4 wireless line terminating device
3 Layer 2 switch
5 line control device
8 wired line terminating device

The invention claimed is:

1. A wireless network relay apparatus, which is equipped with a plurality of line terminating devices corresponding to a plurality of communication lines and which performs line limitation associated with an Adaptive Modulation Radio function, said wireless network relay apparatus comprising:

a traffic measuring part configured to measure traffic, passing through the plurality of line terminating devices, in a plurality of directions, thus recording total traffic;

a modulation scheme detecting part configured to detect whether or not a modulation scheme is changed due to the Adaptive Modulation Radio function in a wireless area;

a modulation scheme judging part configured to specify the line terminating device of the communication line corresponding to the wireless area whose modulation scheme is changed and to judge whether or not a local modulation scheme should be changed;

a modulation scheme determining part configured to determine a desired modulation scheme based on the recorded traffic with the specified line terminating device when it is judged that the local modulation scheme should be changed; and a modulation scheme changing part configured to change the local modulation scheme with the desired modulation scheme.

2. The wireless network relay apparatus according to claim 1, wherein the traffic measuring part sums up traffic in an inflow path direction of the specified line terminating device, among the plurality of line terminating devices, and traffic in an outflow path direction of the specified line terminating device independently, thus recording the traffics in these directions.

3. The wireless network relay apparatus according to claim 1, wherein the traffic measuring part records the traffic which is calculated by multiplying an average value of traffic, passing through the plurality of line terminating devices in a predetermined time, by a predetermined coefficient.

4. The wireless network relay apparatus according to claim 3, wherein the predetermined coefficient is set to 1.2.

5. The wireless network relay apparatus according to claim 1, wherein when the modulation scheme detecting part detects that a modulation scheme is changed in a plurality of wireless areas, the modulation scheme judging part specifies the line terminating device corresponding to the wireless area undergoing a larger variant of band, thus determining whether or not the local modulation scheme should be changed based on the traffic.

6. The wireless network relay apparatus according to claim 1, wherein when modulation scheme detecting part detects that a modulation scheme is changed in a plurality of wireless areas and that the plurality of wireless areas undergoes a same variant of band, the modulation scheme judging part judges that the local modulation scheme should not be changed.

7. The wireless network relay apparatus according to claim 1, wherein when the modulation scheme detecting part detects that a modulation scheme is changed in a plurality of wireless areas, that the plurality of wireless areas undergo a same variant of band, and that one wireless area undergoes a decreased band, the modulation scheme judging part specifies the line terminating device corresponding to the wireless area undergoing the decreased band, thus judging whether or not the local modulation scheme should be changed based on the traffic.

8. The wireless network relay apparatus according to claim 1, wherein the modulation scheme judging part stores a table describing a correspondence relationship between the modulation scheme and the traffic so as to read a secondary modulation scheme based on the changed modulation scheme of the wireless area detected by the modulation scheme detecting part and the traffic of the specified line terminating device, among the plurality of line terminating devices, and wherein when the secondary modulation scheme has a difference, corresponding to a predetermined number of stages or more, compared to the current local modulation scheme, the modulation scheme changing part changes the current local modulation scheme with the secondary modulation scheme.

9. A modulation scheme changing method adapted to a wireless network relay apparatus, which is equipped with a plurality of line terminating devices corresponding to a plurality of communication lines and which performs band limitation associated with an Adaptive Modulation Radio function, said modulation scheme changing method comprising:

measuring traffic, passing through the plurality of line terminating devices in a plurality of directions, thus recording total traffic;

detecting whether or not a modulation scheme is changed due to the Adaptive Modulation Radio function in the wireless area;

specifying the line terminating device of the communication line corresponding to the wireless area whose modulation scheme is changed, thus judging whether or not a local modulation scheme should be changed;

determining a desired modulation scheme based on the recorded traffic with the specified line terminating device when it is judged that the local modulation scheme should be changed; and changing the local modulation scheme with the desired modulation scheme.

10. A non-transitory computer-readable storage medium with an executable program stored thereon, wherein the program causes a computer to execute a modulation scheme changing method adapted to a wireless network relay apparatus, which is equipped with a plurality of line terminating devices corresponding to a plurality of communication lines and which performs band limitation associated with an Adaptive Modulation Radio function, wherein the program instructs the computer to perform the following steps:

measuring traffic, passing through the plurality of line terminating devices in a plurality of directions, and then recording total traffic;

detecting whether or not a modulation scheme is changed due to the Adaptive Modulation Radio function in the wireless area;

specifying the line terminating device of the communication line corresponding to the wireless area whose modulation scheme is changed, thus judging whether or not a local modulation scheme should be changed;

determining a desired modulation scheme based on the recorded traffic with the specified line terminating device when it is judged that the local modulation scheme should be changed; and changing the local modulation scheme with the desired modulation scheme.

* * * * *

UNITED STATES PATENT AND TRADEMARK OFFICE
CERTIFICATE OF CORRECTION

Page 1 of 1

PATENT NO.         : 8,995,905 B2
APPLICATION NO.    : 13/698238
DATED              : March 31, 2015
INVENTOR(S)        : Satoshi Sonobe et al.

It is certified that error appears in the above-identified patent and that said Letters Patent is hereby corrected as shown below:

IN THE SPECIFICATION

Column 1, Line 7: Delete "2012," and insert -- 2011, --

Column 1, Line 9: Delete "2012," and insert -- 2010, --

Column 1, Line 43: Delete "serer," and insert -- server, --

Signed and Sealed this
Seventeenth Day of November, 2015

Michelle K. Lee
*Director of the United States Patent and Trademark Office*